United States Patent Office 3,778,475
Patented Dec. 11, 1973

---

3,778,475
PROCESS FOR THE PREPARATION OF
HYDROXAMOYL CHLORIDES
Julius Jakob Fuchs, 1104 Greenway Road,
Wilmington, Del. 19803
No Drawing. Continuation-in-part of abandoned application Ser. No. 787,581, Dec. 27, 1968. This application Feb. 14, 1972, Ser. No. 226,219
Int. Cl. C07c 119/18
U.S. Cl. 260—566 A    2 Claims

ABSTRACT OF THE DISCLOSURE

Certain α-hydroxyiminoketones are converted to hydroxamoyl chlorides by reaction with a chlorinating agent, such as elemental chlorine, in aqueous medium at a temperature of about −15 to 30° C. The hydroxamoyl chloride obtained in this process are useful intermediates to thiolhydroxamate esters and carbamates having insecticidal properties.

CROSS REFERENCE TO RELATED APPLICATION

This application is a continuation-in-part of my copending application, Ser. No. 787,581, filed Dec. 27, 1968 now abandoned.

BACKGROUND OF THE INVENTION

This invention relates to a process for the preparation of hydroxamoyl chlorides by chlorination of certain α-hydroxyiminoketones.

Hydroxamoyl chlorides are important starting materials for the preparation of certain thiolhydroxamate esters useful as intermediates to carbamate insecticides. Such thiolhydroxamate esters and carbamates are described, for instance, in U.S. Pat. 3,576,834 (to Buchanan).

Prior art methods of preparing hydroxamoyl chlorides include, for example, that of Piloty and Steinbock [Ber. 35, 3101 (1902)], who disclosed the preparation of acetohydroxamoyl chloride by the chlorination of acetaldoxime in dilute, aqueous HCl solution to produce 1,1-chloronitrosoethane; a blue oil, which dimerized to a white solid material. The dimer thus prepared was then dissolved in an organic solvent, diethyl ether, in which a rearrangement to the hydroxamoyl chloride took place during a period of about twelve hours at room temperature.

This procedure for the preparation of the hydroxamoyl chloride was improved by Wieland, as shown in Ber. 40, 1676 (1907). However, the prior art procedures all require the chlorination of the oxime in aqueous HCl solution. The main drawback of such prior art processes is that they produce to a large extent the monomeric and dimeric chloronitrosoethanes, both of which are water-insoluble and must be brought into solution of an organic solvent to facilitate the rearrangement to the hydroxamoyl chloride.

Wieland's procedure was improved, as shown in U.S. Pat. 3,574,736, which discloses that the formation of monomeric and dimeric chloronitroso compounds can be limited to trace amounts by carrying out the chlorination of aldoximes in aqueous solutions containing a minimum of inorganic ions and a concentration of oxime below 13%.

All of the prior art processes require aldoximes as starting materials for the production of hydroxamoyl chlorides. These oximes are prepared from aldehydes and expensive hydroxylamine.

There is a definite need in the art of a simple process for the preparation of hydroxamoyl chlorides, which would start with inexpensive chemicals, would tolerate inorganic ions, and would not require organic solvents.

SUMMARY OF THE INVENTION

According to this invention, there is provided a process for the preparation of hydroxamoyl chlorides having the following Formula 1

wherein R is methyl, ethyl, or methoxymethyl;

the process comprising contacting a chlorinating agent at −15 to 30° C. in the presence of water and under acidic conditions with an α-hydroxyiminoketone having the following Formula 2

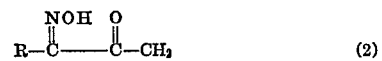

wherein R has the above-defined meaning.

DETAILED DESCRIPTION OF THE INVENTION

The process of the present invention can be illustrated by the following equation, wherein elemental chlorine is the chlorinating agent:

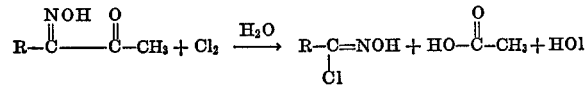

This cleavage does not occur in neutral or alkaline medium, and it is thus necessary to maintain an acidic pH during the chlorination reaction. It is possible, however to begin the chlorination in basic medium, provided the pH is eventually adjusted to acidic. For the purpose of this disclosure, the "acidic conditions" may occur at any stage during chlorination, so long as the final pH is acidic.

The starting α-hydroxyiminoketones can be readily synthesized from the corresponding ketones by reaction with nitrous acid, as described in Org. Synth. Coll., vol. II, pp. 204–208 for the preparation of 3-hydroxyimino-2-butanone. The chlorination of the α-hydroxyiminoketone results in the cleavage of the molecule to form the hydroxamoyl chloride and acetic acid. A particular advantage of this process is that it is carried out in water.

The starting α-hydroxyiminoketones are only moderately soluble in the aqueous reaction medium; therefore, a suspension is present at the beginning of the reaction. For ease of handling of the suspensions, it is advisable not to exceed solids concentrations of about 50 weight percent, preferably of about 30 weight percent.

A stoichiometric quantity of chlorine is ordinarily used, although it can vary slightly from stoichiometric within about plus or minus 5%. As will be recognized by those skilled in the art, excess chlorine may result in overchlorination and production of undesirable 1,1-dichloro-1-nitroso compounds, while a deficiency of chlorine will ordinarily cause underchlorination, leaving some unchanged α-hydroxyiminoketone. In either case, the yield is reduced. It is preferable to decrease the rate of chlorine addition towards the end of the reaction to avoid a high chlorine concentration in the solution and the possibility of chlorinating the already formed hydroxamoyl chloride. Thus, if the chlorination time is for example one hour, 75% of the chlorine can advantageously be added during the first 30 minutes. The next 17% of the chlorine in the next 15 minutes and the remaining 8% of the chlorine in the remaining 15 minutes.

The temperature during chlorination can range from −15° C. to about 30° C. While the chlorination proceeds more rapidly at higher temperature, so do undesirable side reactions, such as the hydrolysis of the hydroxamoyl chloride, to give acetic acid and hydroxylamine hydrochloride. For best yields, it is preferable to operate as near to the freezing point of the aqueous solution as possible. Thus, under optimum operating conditions the temperature will ordinarily be below about 10° C., usually near 0° C., at the beginning of the reaction and near −15° C. at the end of the reaction. Chlorination is ordinarily completed in from about one-half hour to several hours.

Although other chlorinating agents than chlorine—for example, sulfuryl chloride and organic hypochlorites such as tert-butyl hypochlorite—can be used, elemental chlorine is preferred because of economy and ease of operation.

The hydroxamyl chloride product can be isolated, if desired, by conventional techniques, such as extraction with methylene chloride from the water solution and evaporation of the methylene chloride under vacuum. However, because of the instability of the hydroxamoyl chloride, it is often preferred to use the aqueous solutions directly in the preparation of thiolhydroxamate esters, without isolating the hydroxamoyl chloride.

The process of this invention is further illustrated by the following examples, wherein parts and percentages are by weight unless otherwise noted.

Example 1

To an agitated suspension of 50.5 parts of 3-hydroxyimino-2-butanone in 200 parts of water at 0° C. were gradually added 36 parts of chlorine during a period of 60 minutes. The first 27 g. chlorine were added in 30 minutes, the next 6 g. chlorine in the next 15 minutes, and the remaining 3 g. chlorine in the remaining 15 minutes. As the chlorination progressed, the solids dissolved slowly, and the temperature of the reaction mass was gradually reduced to −10° C. At the end of the chlorination a blue color appeared, which was caused by the formation of less than 3 parts of 1,1,1-dichlorointrosoethane, a product formed by chlorination of acethydroxamoyl chloride. Repeated extraction of the aqueous solution with methylene chloride, followed by drying of the combined extracts with CaCl$_2$ and evaporation of the solvent at a temperature below 25° C., gave crude acethydroxamoyl chloride in 85% yield. This material contained small amounts of acetic acid and 1,1,1-dichloronitrosoethane.

Example 2

Following the procedure of Example 1, to a suspension of 57.5 parts of 3-hydroxyimino-2-pentanone in 250 parts of water were gradually added 36 parts of chlorine during a period of 60 minutes just above the freezing point of the reaction mass. At the conclusion of the chlorine addition the reaction mass was extracted with methylene chloride followed by drying and solvent evaporation as in Example 1. The crude product, propionhydroxamoyl chloride was obtained in approximately 80% yield.

Example 3

Following the procedure of Example 1, to a suspension of 65.5 parts of 3-hydroxyimino-4-methoxy-2-butanone in 250 parts of water were gradually added 36 parts of chlorine during a period of 60 minutes just above the freezing point of the reaction mass. At the conclusion of the chlorine addition, the reaction mass was extracted with methylene chloride followed by drying and solvent evaporation as in Example 1. The crude product, methoxyacethydroxamoyl chloride, was obtained in approximately 80% yield.

Example 4

To an agitated suspension of 50.5 parts of 3-hydroxyimino-2-butanone in 200 parts of water at 0° C. were gradually added 36 parts of chlorine within 60 minutes as in Example 1. As the chlorination progressed, the solids dissolved slowly and the temperature of the reaction mass was gradually reduced to −10° C. At the end of the chlorination, a blue color appeared, which was caused by the formation of small amounts of 1,1,1-dichloronitrosoethane, a product of overchlorination.

To the aqueous solution of acethydroxamoyl chloride as obtained above, were added 150 parts of methylene chloride and 30 parts of methyl mercaptan at −10 to 0° C., followed by the gradual addition of 120 parts of 50% aqueous sodium hydroxide solution at −10 to 0° C. to give a pH of 7–8. The organic phase of the resulting reaction mass was then separated, and the aqueous phase repeatedly extracted with methylene chloride. The combined methylene chloride solutions were then dried and analyzed by gas chromatography, which showed the presence of 34 parts (65% yield) of methyl N-(hydroxy) thioacetimidate. After evaporation of the methylene chloride, the crude product was purified by one recrystallization from water, to give pure product, melting point 95–96° C.

I claim:

1. A process for preparing a hydroxamoyl chloride having the formula

wherein R is methyl, comprising contacting in the presence of water and under acidic conditions an α-hydroxyiminoketone of the formula

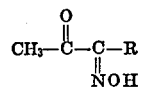

wherein R is as defined above, with elemental chlorine, in an approximately stoichiometric amount based on the α-hydroxyiminoketone, at a temperature between about −15° C. and 30° C.

2. The process of claim 1 wherein the maximum temperature is about 10° C.

References Cited

UNITED STATES PATENTS 2,299,742    10/1942    Ehman et al. _ _ _ _ _ _  260—566 A

OTHER REFERENCES

Noller: Chem. Org. Cmpds., 3rd ed. (1965), pp. 285.

LORRAINE A. WEINBERGER, Primary Examiner

R. D. KELLY, Assistant Examiner